United States Patent
Carrick et al.

(10) Patent No.: US 10,200,138 B2
(45) Date of Patent: Feb. 5, 2019

(54) METHOD FOR JOINTLY ADAPTING AN OFDM WAVEFORM AND THE DEMODULATOR FOR INTERFERENCE MITIGATION AND HARSH CHANNELS

(71) Applicant: Virginia Tech Intellectual Properties, Inc., Blacksburg, VA (US)

(72) Inventors: Matthew Carrick, Blacksburg, VA (US); Jeffrey H. Reed, Blacksburg, VA (US); Vuk Marojevic, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 15/565,614

(22) PCT Filed: Apr. 7, 2016

(86) PCT No.: PCT/US2016/026509
§ 371 (c)(1),
(2) Date: Oct. 10, 2017

(87) PCT Pub. No.: WO2016/164628
PCT Pub. Date: Oct. 13, 2016

(65) Prior Publication Data
US 2018/0076915 A1  Mar. 15, 2018

Related U.S. Application Data

(60) Provisional application No. 62/293,979, filed on Feb. 11, 2016, provisional application No. 62/144,039, filed on Apr. 7, 2015.

(51) Int. Cl.
*H04J 11/00* (2006.01)
*H04L 27/26* (2006.01)
(Continued)

(52) U.S. Cl.
CPC .......... *H04J 11/0023* (2013.01); *H04B 1/525* (2013.01); *H04L 5/0023* (2013.01); *H04L 27/2601* (2013.01); *H04L 27/2646* (2013.01)

(58) Field of Classification Search
CPC combination set(s) only.
See application file for complete search history.

(56) References Cited

U.S. PATENT DOCUMENTS 7,724,639 B1  5/2010  Porat et al.
8,855,230 B1  10/2014 Karabinis
(Continued)

OTHER PUBLICATIONS

Gardner, William; Cyclic Wiener Filtering: Theory and Method; IEEE Transactions on Communications; vol. 41, No. 1; Jan. 1993; 13 pages.

(Continued)

*Primary Examiner* — Khaled M Kassim
*Assistant Examiner* — Syed Ali
(74) *Attorney, Agent, or Firm* — Keith A. Vogt; VOGT IP

(57) ABSTRACT

The present invention provides a method and system for a processing multicarrier signal to create a spectral correlation across multiple antennas. The system includes at least one transmitter adapted to create a plurality of symbols, each symbol representing one or more bits from a plurality of bitstreams. The transmitter creates a plurality of repetition patterns, each pattern containing a copy of the symbols and each repetition pattern comprising a combination of symbols that varies in time, frequency and space. The repetition patterns are transmitted over and received by one or more separate antennas where a receiver demodulates the repetition patterns and linearly combines each repeated symbols across time, frequency and space to estimate said transmitted symbol.

8 Claims, 14 Drawing Sheets

(51) Int. Cl.
*H04L 5/00* (2006.01)
*H04B 1/525* (2015.01)

(56) References Cited

U.S. PATENT DOCUMENTS

| | | |
|---|---|---|
| 2005/0031047 A1 | 2/2005 | Maltsev et al. |
| 2005/0265275 A1* | 12/2005 | Howard .............. H04B 7/0417 |
| | | 370/328 |
| 2006/0209749 A1* | 9/2006 | Blanz ................... H04L 1/0009 |
| | | 370/328 |
| 2008/0075033 A1* | 3/2008 | Shattil ................... H04B 7/026 |
| | | 370/328 |
| 2009/0225887 A1 | 9/2009 | Sutton |
| 2009/0257483 A1 | 10/2009 | French et al. |
| 2009/0268603 A1* | 10/2009 | Sampath .............. G06F 17/142 |
| | | 370/210 |
| 2010/0086066 A1 | 4/2010 | Chrabieh et al. |
| 2011/0110304 A1 | 5/2011 | Kuchi et al. |
| 2011/0261898 A1 | 10/2011 | Huang et al. |
| 2011/0268100 A1* | 11/2011 | Gorokhov ............. H04B 7/024 |
| | | 370/342 |
| 2012/0121046 A1 | 5/2012 | Choi et al. |
| 2012/0182914 A1* | 7/2012 | Hariharan ............ H04L 1/1614 |
| | | 370/311 |
| 2013/0044028 A1* | 2/2013 | Lea ........................ H01Q 21/24 |
| | | 342/359 |
| 2017/0222847 A1* | 8/2017 | Feher .................. H04L 27/2601 |
| 2017/0244588 A1* | 8/2017 | Ling ..................... H04L 1/0009 |

OTHER PUBLICATIONS

Tian, Jinfeng; Frequency Shift filtering for OFDM Systems and Its Performance analysis; IEEE Systems Journal, 2011.

Sutton, Paul; Cyclostationary Signatures in Practical Cognitive Radio Applications; IEEE Journal on Selected Areas; vol. 27, No. 1; Jan. 2008; 12 pages.

Bingham, John; Multicarrier Modulation for Data Transmission: an Idea Whose Time Has Come; IEEE Communications Magazine; IEEE May 1990; 8 pages.

United States Internatinal Searching Authority; International Search Report & Written Opinion for PCT/US2016/026509; dated Jul. 15, 2016; 10 pages; Alexandria, VA; US.

\* cited by examiner

| ODFM Symbol | 1 | A | B | C | D | E | F | G | H | I | J | K | L | M | N | O | P |
|---|---|---|---|---|---|---|---|---|---|---|---|---|---|---|---|---|---|
| | 2 | M | N | O | P | A | B | C | D | E | F | G | H | I | J | K | L |
| | 3 | I | J | K | L | M | N | O | P | A | B | C | D | E | F | G | H |
| | 4 | E | F | G | H | I | J | K | L | M | N | O | P | A | B | C | D |

Subcarriers: 1 2 3 4 5 6 7 8 9 10 11 12 13 14 15 16

FIG. 1

| | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| ODFM Symbol | 1 | AA | BB | CC | DD | EE | FF | GG | HH | AA | BB | CC | DD | EE | FF | GG | HH |
| | 2 | EE | FF | GG | HH | AA | BB | CC | DD | EE | FF | GG | HH | AA | BB | CC | DD |

Subcarriers

FIG. 2

| | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| ODFM Symbol | 1 | AA | BB | CC | DD | EE | FF | GG | HH | AA* | BB* | CC* | DD* | EE* | FF* | GG* | HH* |
| | 2 | EE* | FF* | GG* | HH* | AA | BB | CC | DD | EE | FF | GG | HH | AA* | BB* | CC* | DD* |

Subcarriers

FIG. 3

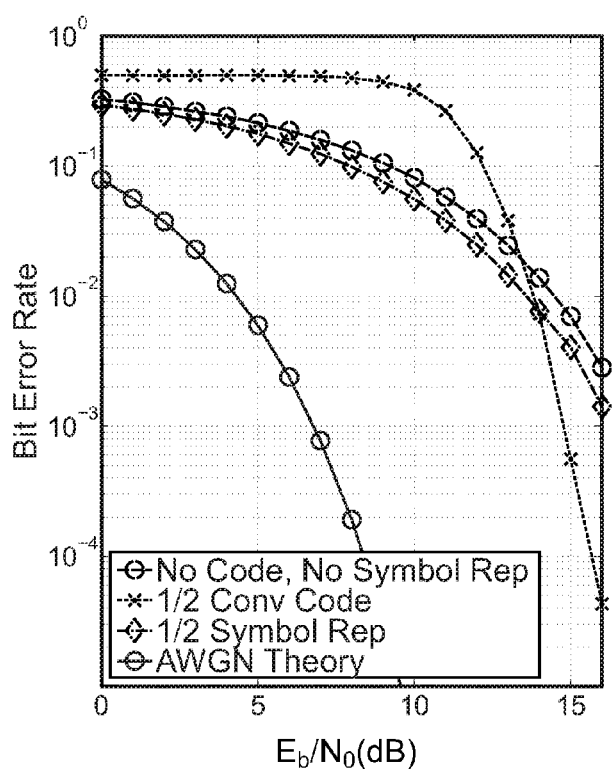
FIG. 14A
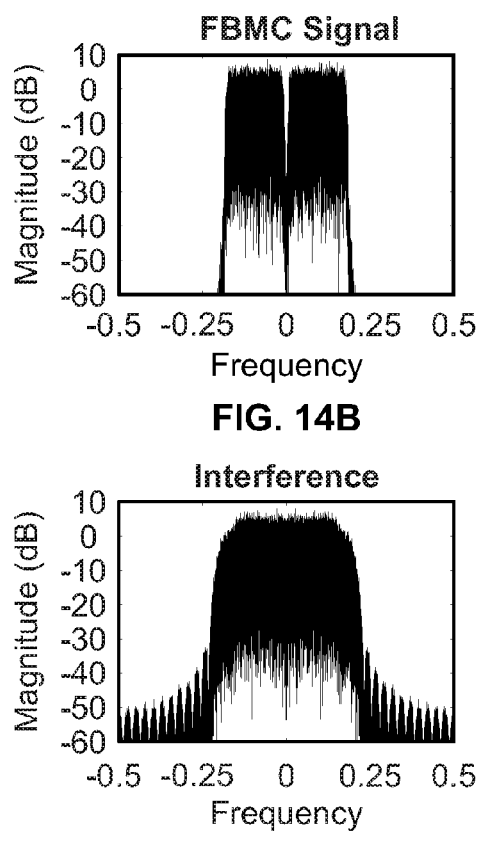
FIG. 14B
FIG. 14C

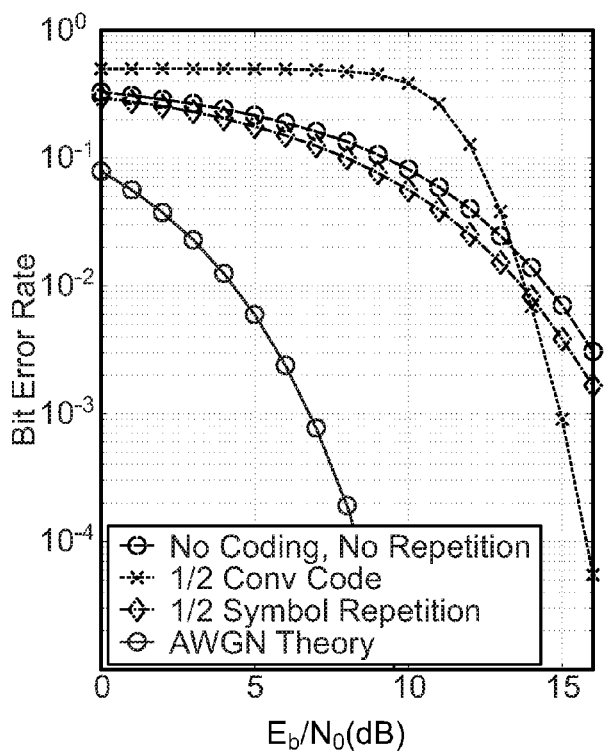
FIG. 15A
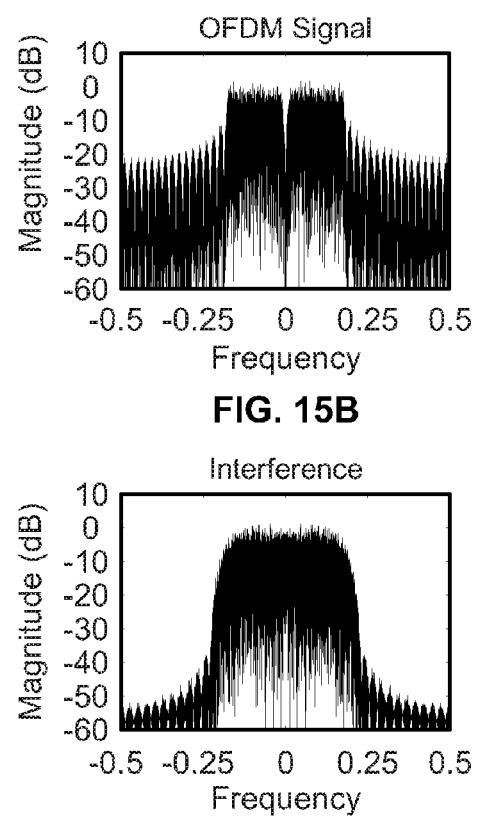
FIG. 15B
FIG. 15C

METHOD FOR JOINTLY ADAPTING AN OFDM WAVEFORM AND THE DEMODULATOR FOR INTERFERENCE MITIGATION AND HARSH CHANNELS

RELATED APPLICATIONS

This application claims the benefit of U.S. Provisional Application No. 62/144,039 filed Apr. 7, 2015 and herein incorporated by reference. This application also claims the benefit of U.S. Provisional Application No. 62/293,979 filed Feb. 11, 2016 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

The invention relates to a communication system using OFDM (Orthogonal Frequency Division Multiplexing) modulation.

BRIEF SUMMARY OF THE INVENTION

In one embodiment, the present invention jointly designs and adapts an OFDM waveform and demodulator according to the channel conditions. The parameters of the waveform that can be adapted include, but are not limited to: Multicarrier modulation formats such as OFDM, FBMC, etc.; modulation per subcarrier; power per subcarrier; number of subcarriers; subcarrier bandwidth (set bandwidth uniformly or non-uniformly across all subcarriers); Cyclic Prefix (CP) length; Pulse Shaping; Error Correction Coding (ECC); and the pattern by which the subcarriers are spectrally correlated.

In other embodiments, the techniques of the present invention are applicable across all multicarrier waveforms. In yet other embodiments, a modulator of the present invention will translate a time-frequency grid of symbols into a waveform, and the demodulator will then translate it back into a time-frequency grid. The spectral redundancy of the symbols may be optimally combined by a FRESH filter after the demodulation step. This embodiment presents an efficient implementation and is applicable to all multicarrier waveforms, including but not limited to, Orthogonal Frequency Division Multiplexing (OFDM), Orthogonal Frequency Division Offset Quadrature Amplitude Modulation (OFDM-OQAM) which is also referred to as Filterbank Multicarrier (FBMC), Wavelet Packet Modulation (WPM) and in Single Carrier Frequency Division Multiple Access (SC-FDMA) waveforms.

In yet other embodiments, the parameters of the waveforms can also be modified on a per-antenna basis. This includes repeating symbols across multiple antennas and incorporating spatial diversity into the waveform, and using that diversity in the FRESH filter in the receiver.

In still further embodiments, the present invention provides a multicarrier waveform that is tailored to the channel conditions that can then be designed and jointly adapted with the FRESH filter and demodulator such that the interference is rejected and the throughput of the communication link is maximized. This embodiment provides a number of improvements over existing designs. Spectral efficiency is improved as compared to spread spectrum approaches such as Frequency Hopping (FH) and Direct Sequence Spread Spectrum (DSSS). Spectral efficiency is further improved as compared to notching subcarriers or vacating frequency bands. The present invention, in some aspects, rejects interference at the signal level, as opposed to error correcting codes that remove it at the bit level. Without a FRESH filter the presence of interference can make demodulation (and therefore decoding) impossible, giving the ECC little value. The present invention reduces latency as compared to Hybrid Automatic Repeat Request (ARQ) systems. By transmitting spectral copies of information, the likelihood that the signal is received correctly on the first transmission is greater. Hybrid ARQ systems will retransmit multicarrier symbols if they are not received properly, but incur large latencies as the symbol must be received, decoded, and then the transmitter must be notified of the multicarrier symbol that is in error so it can be retransmitted.

In other embodiments, the present invention has an ability to repeat subcarriers in both time and frequency and gives the receiver the ability to reject interference in an improved manner as compared to traditional filtering approaches and in a more bandwidth efficient manner than spread spectrum techniques. By incorporating degrees of freedom in OFDM waveforms, the parameters can be tuned to meet objectives at the physical layer or at the network layer.

In yet other embodiments, present invention provides a design technique that is revolutionary in its joint design of both the waveform and demodulator, which allows for on the fly adaptation and cancellation of interference that is unparalleled. The design is effective in both time and frequency. The technique is applicable to any multicarrier waveform, and can also be extended to work with multiple antennas.

In yet other embodiments, present invention advances the state of the art by designing dynamic waveforms and receivers which are the ultimate in physical layer adaptability. The waveform and receiver are designed and adapted on the fly according to the spectral environment, which creates a tremendous amount of flexibility that is not seen in the current state of the art communication links. The receiver outperforms convolutional codes and traditional linear time-invariant notch filters for interference rejection. The proposed technique is applicable to frequency hopping signals and multicarrier signal. The proposed technique is an enabler for the following applications: Robust and Reliable Waveforms; Waveforms for Full-Duplex Communication; Heterogeneous Waveform Co-existence; Multi-user Access and Dynamic Spectrum Access (DSA) Waveforms; Control Channel Protection. The present invention, in other embodiments, is applicable to all multicarrier signals, including Filter Bank Multicarrier (FBMC) and all its variants, OFDM and SC-FDM.

In yet other embodiments, the present invention provides an approach that has flexibility in the waveform and receiver with an ability to be designed and adapted according to the interference present in the communication link. Information and signal energy can be allocated in a very fine grained fashion which dramatically improves the capacity of a wireless link even when under heavy interference compared to traditional techniques. Error correcting codes, Direct Sequence Spread Spectrum (DSSS) and frequency hopping techniques distribute the information and signal energy evenly across the frequency band, which is rarely the optimal allocation. The redundant placement of symbols allows patterns to be formed which create cyclostationary properties of the desired signal. These patterns are designed and adapted according to the interference. This allows the receiver to orthogonalize the desired signal and the interference using a FRESH filter, canceling it down to the noise floor. Adaptive approaches can be used to adapt the pattern as well as the filter weights as the interference changes over time. FRESH filtering is a well-established field of study although prior works have largely considered only the cyclostationary properties inherent in signals. In yet other embodiments of the present invention, cyclostationary properties are design parameters, based on how the symbols are repeated within the waveform.

Error correcting codes assume stationary noise, and if a modulated signal is received for interference, this assumption is broken and leads to an undesirable bit error rate. The proposed method of other embodiments of the present invention uses the symbol repetition method to create the appropriate cyclostationary parameters such that the FRESH filter can separate the desired signal and the interference. Hybrid approaches of the present invention can also be used where the symbol repetition is used to remove cyclostationary interference and then relies on tradition error correcting codes to remove the stationary white noise.

In still other embodiments, the present invention provides a novel technique for building frequency hopping waveforms for interference rejection. The protection against interference can scale with the type and severity of interference, and in a much more fine grained way than error correcting codes. The proposed techniques of the present invention have many advantages over the current state of the art. In one embodiment, the present invention allows for extremely flexible placement of information and signal energy in time, frequency and space. This placement allows for increases in capacity and decreases in BER. The flexibility of the waveform can extend down to a frame-by-frame basis as well, allowing for the waveform to be adapted on the fly as the spectral environment changes.

In still other embodiments, the present invention provides a system wherein the waveform and demodulator are adapted based on the interference including adjacent channel interference, self-interference, and/or full duplex interference.

In still other embodiments, the present invention is adapted to reduce latencies such as by limiting retransmissions.

In still other embodiments, the present invention the waveform is adapted based on system constraints including latency, throughput, BER and FER.

In still other embodiments, the present invention provides a system wherein a multicarrier signal is comprised of a plurality of channels and the channels are assigned different priority levels based on the information being transmitted thereon and allocated different amounts of redundancy based on an assigned priority level.

In still other embodiments, the present invention provides a system wherein priority is based on a channel being a control channel or a data channel.

In still other embodiments, the present invention provides a system wherein interference is canceled at the signal level.

In still other embodiments, the present invention provides a system including a plurality of base stations, each of the base stations transmit a plurality of repetition patterns, to permit a signal to be transmitted and received by a plurality of different base stations.

In still other embodiments, the present invention provides a system wherein repetition patterns are transmitted and received over different frequency bands and/or disjointed bands.

In still other embodiments, the present invention provides a system wherein the receiver is configured to demodulate the repetition patterns received by a plurality of antennas and to linearly combine each repeated symbol across time, frequency and space to incorporate the temporal, spatial, spectral correlation, conjugate spectral correlation cyclostationary properties of the received signal to estimate the transmitted symbol.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 1 provides an example of a pattern for an embodiment of the present invention that only has time-repetition shown in a time-frequency grid. In this example, there are 16 unique subcarrier symbols in the block of 4 OFDM symbols. The first OFDM symbol and the second OFDM symbol contain the same subcarrier symbols, although they have been circularly shifted in frequency for the second OFDM symbol. This pattern repeats for the remaining OFDM symbols in the block.

FIG. 2 illustrates another example pattern for an embodiment of the present invention that has both time and frequency based repetition. In this example, there are 8 unique subcarrier modulations within a block of two OFDM symbols. Subcarriers are also repeated twice within each OFDM symbol FIG. 3 shows, for another embodiment of the present invention, how extensions to the repetition pattern can be made that include the conjugation of the repeated subcarriers. This is the same example as FIG. 2, with the difference that the * represents the conjugation operation. As an example, if the AA square has the symbol 1+j applied to it, then the conjugated AA square will have the symbol 1−j. By knowing the repetition pattern at the receiver, this conjugation can be incorporated into the FRESH filter.

FIGS. 14A, 14B and 14C provide, for another embodiment of the present invention, results that use the FBMC waveform with QPSK subcarriers and full bandwidth single carrier interference with SIR=0 dB.

FIGS. 15A, 15B and 15C provide, for another embodiment of the present invention, results that use the OFDM waveform with QPSK subcarriers and full bandwidth single carrier interference with SIR=0 dB.

DETAILED DESCRIPTION OF THE INVENTION

Figure 4:
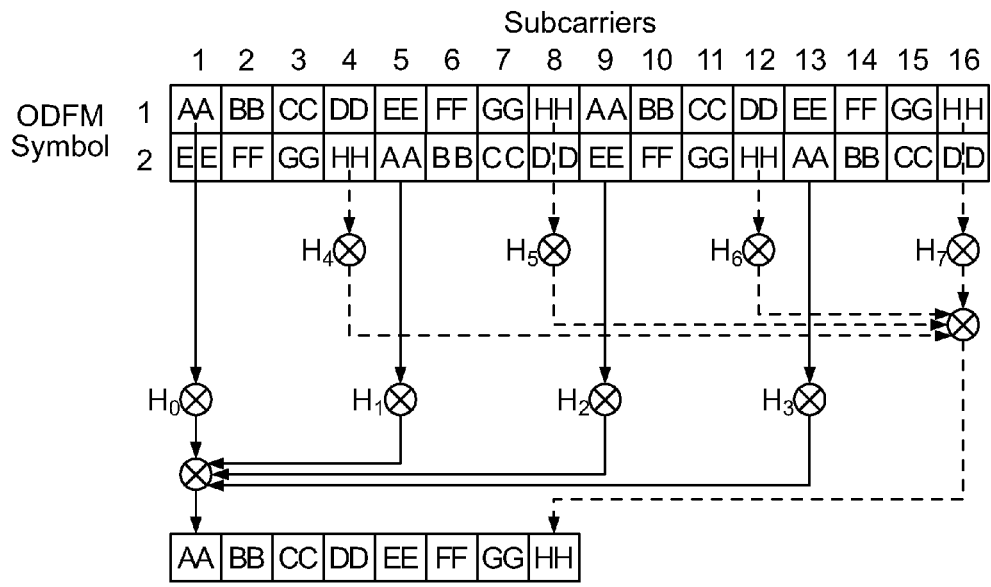
FIG. 4 is an example, for another embodiment of the present invention, of how the FRESH filter uses the various spectral copies of the repeated subcarrier to improve its estimate of the transmitted symbols. In this example, each subcarrier is repeated four twice: twice in an OFDM symbol, and then across two OFDM symbols. The filter coefficients $H_0$ through $H_7$ are formed such that they incorporate the spectral redundancy into the estimate of the desired signal while limiting the impact of the interference and channel effects on the estimate.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

The embodiments of the present invention improve upon existing methods because traditional multicarrier equalization techniques are approximations to the Wiener filter such as pilot-tone based equalization. FIGS. 7-11 give examples of the improved performance. A known use of a Wiener filter is for stationary time series, while the Cyclic Wiener Filter may be used for cyclostationary time series. The Wiener filter is a simplified version of the Cyclic Wiener filter, which also has a reduced performance mean squared error (MSE) when estimating signals. The FRESH filters used with the embodiments of the present invention are approximations to the Cyclic Wiener filter and therefore have improved performance as compared to algorithms that use approximations to the Wiener filter. As a result of a multicarrier signal becoming cyclostationary through the subcarrier repetition patterns, a FRESH filter may be used. The cyclic prefix introduces very little spectral redundancy. As a result, for certain embodiments of the present invention, less signal processing gain is possible. In other aspects, the repetition patterns of the present invention provide another degree of freedom.

An example of the repetition of symbols that may be used with the embodiments of the present invention is given using an OFDM signal for clarity, as the time-frequency grid is more clear and simpler to describe using this modulation. However, other patterns may be used as well with the teachings of the present invention.

Patterns are formed which force spectral correlation across the subcarriers. This takes one symbol and applies it to multiple subcarriers, either within a single OFDM symbol or multiple OFDM symbols. The repetition pattern can be designed initially to match the spectral environment, and then updated over time if the environment changes. FIGS. 1-3 provide examples of repetition patterns that may be used with the embodiments of the present invention.

When the parameters of the interference are known or estimated, the repetition pattern of the OFDM (or other multicarrier) waveform can be designed accordingly. This includes the amount of repetition in both time and frequency, as well as the arrangement of the repetition. If the interference does not vary with time, then the repetition can be limited to multicarrier for a symbol by symbol basis. If the interference has a time-varying nature like a frequency hopping signal, then the repetition pattern in both time and frequency can be designed such that the repetition pattern produces subcarriers that are not continuously interfered with. If the interference is cyclostationary, the spectral correlation properties can also be taken into account at the receiver for additional resilience to the interference.

The same is true for creating a pattern when the received signal is distorted by a multipath channel. When the multipath environment is known or estimated, the repetition pattern can be designed accordingly. If the channel does not vary with time, then a pattern can be created where the subcarriers that are in spectral nulls can be repeated across subcarriers that are less affected. If the multipath does vary with time, then the pattern can incorporate this as well by adapting over time to a new repetition pattern that matches the new multipath environment.

The repetition pattern can be used with bit-loading such that each subcarrier can have its own modulation. For example, in FIG. 2, the subcarriers that are marked by the AA squares can be modulated with QPSK, the BB squares are using 8-PSK, the CC squares are using 16-QAM and so on. The specific modulation that is being used will be adapted along with the other parameters of the multicarrier signal.

The repetition can be incorporated into the Long Term Evolution (LTE) and other standards by modifying the scheduling algorithm. The scheduling algorithm determines how users are allocated subcarriers in both time and frequency, can be used to maximize and balance network objectives such as throughput and latency. The scheduling can be incorporated across multiple basestations for load balancing, where spectral redundancy can be allocated across multiple base stations and transmitters where the user can combine the redundancy in a manner similar to coordinated multipoint combining. This technique allows a soft combining of both base stations to improve reliability of handover and enable soft handovers. When both the eNodeB and the user equipment (UE) have knowledge of the repetition pattern, the users can then make use of the spectrally redundant data on the downlink. The radio receiver in the UE would need to be modified such that they have a FRESH filter which can make use of the spectrally redundant data.

In yet other embodiments of the present invention, the multicarrier waveform parameters can be adapted according to the spectral environment as well as being adapted to best suit network objectives when many communication links are being operated. The repetition pattern can be set according to the multipath channel and the interference. The modulation order per subcarrier and power per subcarrier can then be set according to the bit error rate (BER) or frame error rate (FER) set by the network operator. The repetition pattern can also be used as a way to reduce latency by limiting retransmissions from a Hybrid ARQ system. The waveform parameters can then be optimized such that they meet multiple objectives set by the network operator. The network operator can also make tradeoffs between latency, throughput, BER and FER and have the waveform adapt to the constraints.

Figure 5:
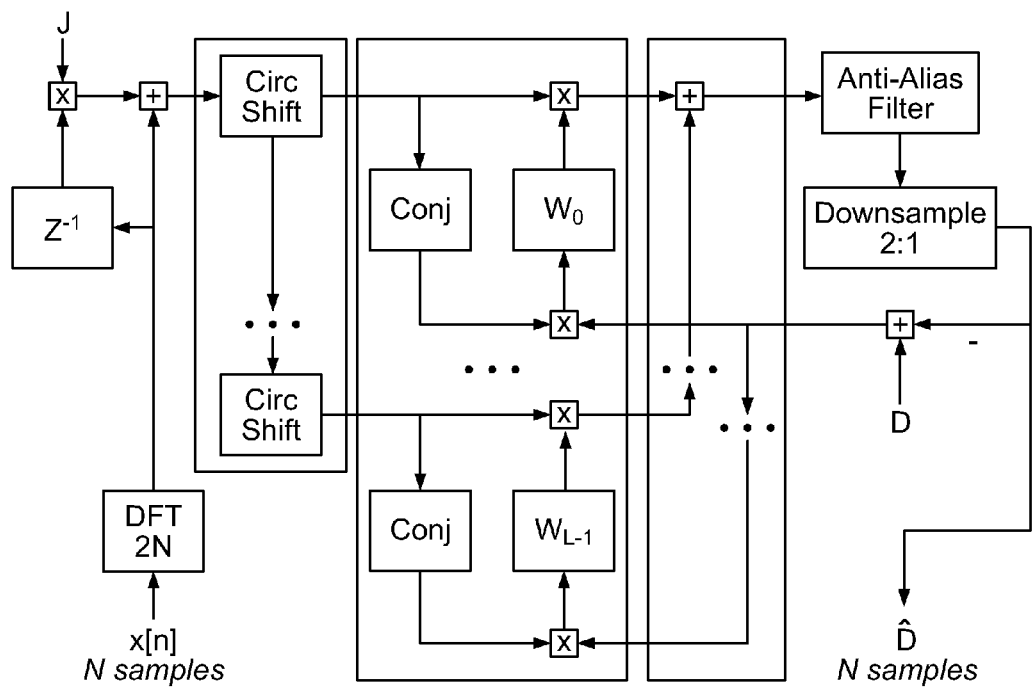
FIG. 5 illustrates an example, for another embodiment of the present invention, of an adaptive FRESH filter for a repetition pattern that only exists within a single OFDM symbol, or a block size of 1 OFDM symbol. This filter structure is based on the "overlap and add" technique, which allows multiple OFDM symbols to be jointly filtered at the same time so multipath can be removed very effectively. The received signal is transformed into the frequency domain and then the frequency alignment is performed by the circular shifting. The filters $W_0$ through $W_{L-1}$ are applied and the result is then summed. L is the number of times each subcarrier is repeated within the OFDM symbol. The filter output is then anti-aliasing filtered and down sampled to get to the estimate of the desired signal. This estimate is used to form a feedback path that adapts the filter weights.
Figure 6:
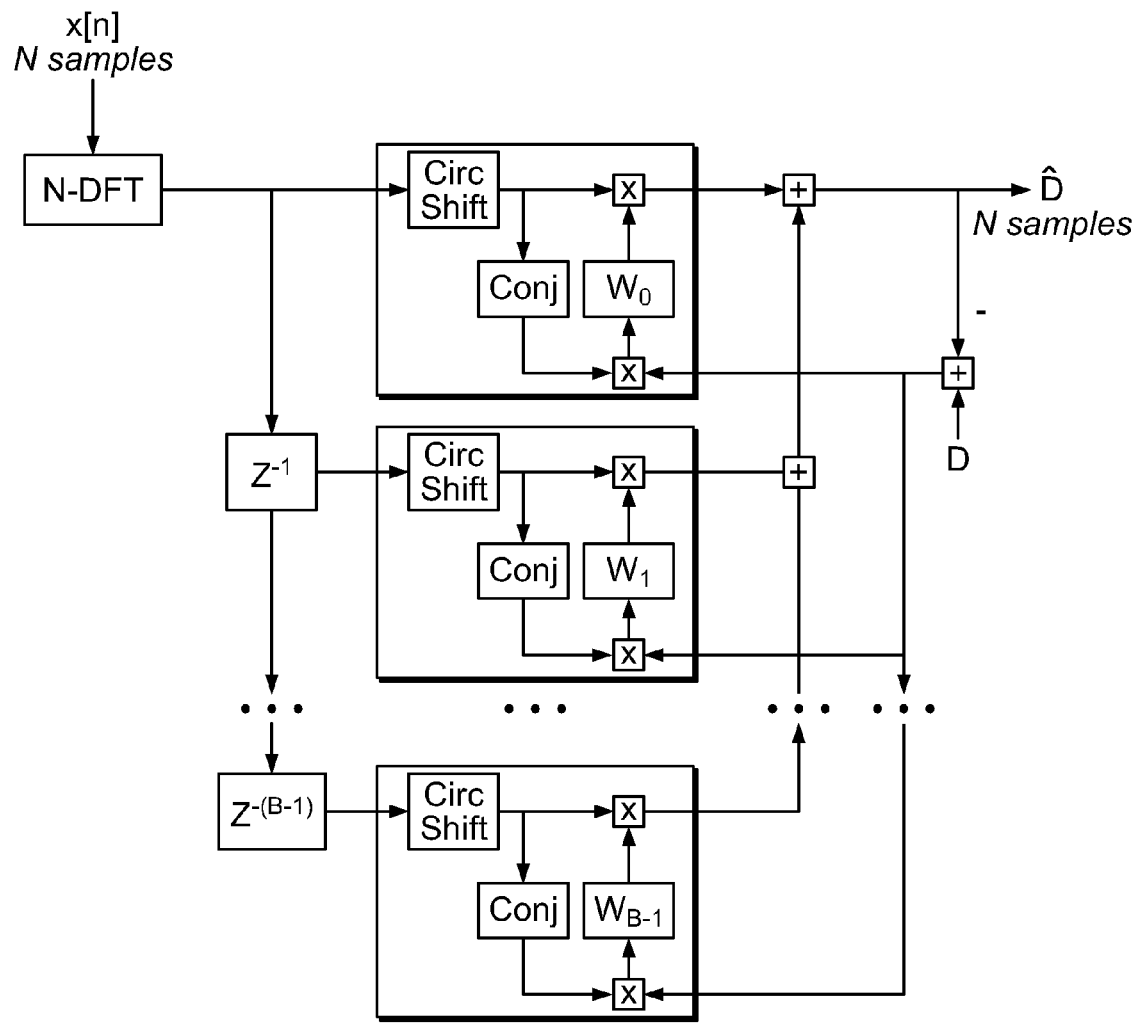
FIG. 6 illustrates an adaptive FRESH filter structure, for another embodiment of the present invention, that is used to incorporate spectral correlation in both time and frequency. Each OFDM symbol is transformed into the frequency domain using the DFT. All of the OFDM symbols are aligned with the delay line and then jointly filtered with filters $W_0$ through $W_{B-1}$, where B is the number of OFDM symbols per block. It is assumed that each filter, W, incorporates the spectral redundancy within each OFDM symbol (as in FIG. 5) internal to the filter, although it is not provided here for simplicity. Once all B OFDM symbols have been filtered, the filter then resets the memory elements in the delay line, loads another B OFDM symbols and performs another estimate. The reset is not provided for simplicity of the diagram.

In still other aspects of the present invention, the FRESH filter will perform on a block by block basis, where one block is a set of OFDM symbols that contain subcarrier repetition. The FRESH filter will filter each block independent of successive blocks to form an estimate of the unique subcarrier symbols. Visual representations of this process are given in FIGS. 4-7. The block of OFDM symbols will be transformed into the frequency domain where they will be FRESH filtered. Knowing the repetition pattern will allow the FRESH filter to combine the spectrally redundant symbols. By filtering in the frequency domain, the symbols can be filtered efficiently and then decisions can be made on the estimated symbols. Feedback is established at the output of the FRESH filter which will adapt the filter coefficients. The algorithms that are shown in FIGS. 5 and 6 show an LMS algorithm, although other cost functions and feedback mechanisms can be used to form the error signal. These include, but are not limited to, constant modulus, decision directed, decision feedback and recursive least squares (RLS).

The embodiments of the present invention may be applied to a number of applications, including: Multi-user Access; Adjacent Channel Interference Cancellation; Co-Channel Interference Cancellation; Homogenous and Heterogeneous waveform co-existence; Radar and communications co-existence; Control Channel Protection; Robust and reliable Waveforms, and networking; Dynamic spectrum access; UAV Communications.

Figure 8:
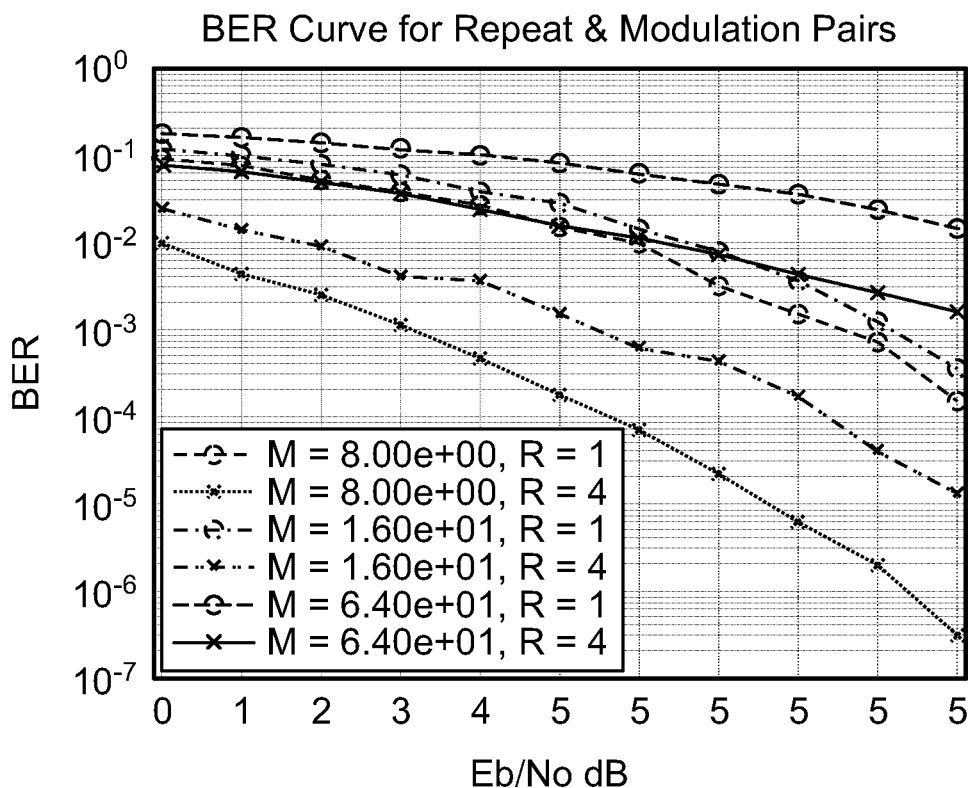
FIG. 8 shows the BER for various modulation and repetition rate values, for another embodiment of the present invention, as the Eb/No (SNR) varies. The modulations are 8-PSK (M=8), 16-QAM (M=16), and 64-QAM (M=16). Two repetition rates are considered, R=1 (Wiener Filter) and R=4, with only repetition within a single OFDM symbol and none across time. There are 1200 subcarriers used in each OFDM symbol. There is no interference and no multipath in this example, only white Gaussian noise. Considerable improvements in BER can be seen for all modulations when comparing R=1 to R=4.
Figure 9:
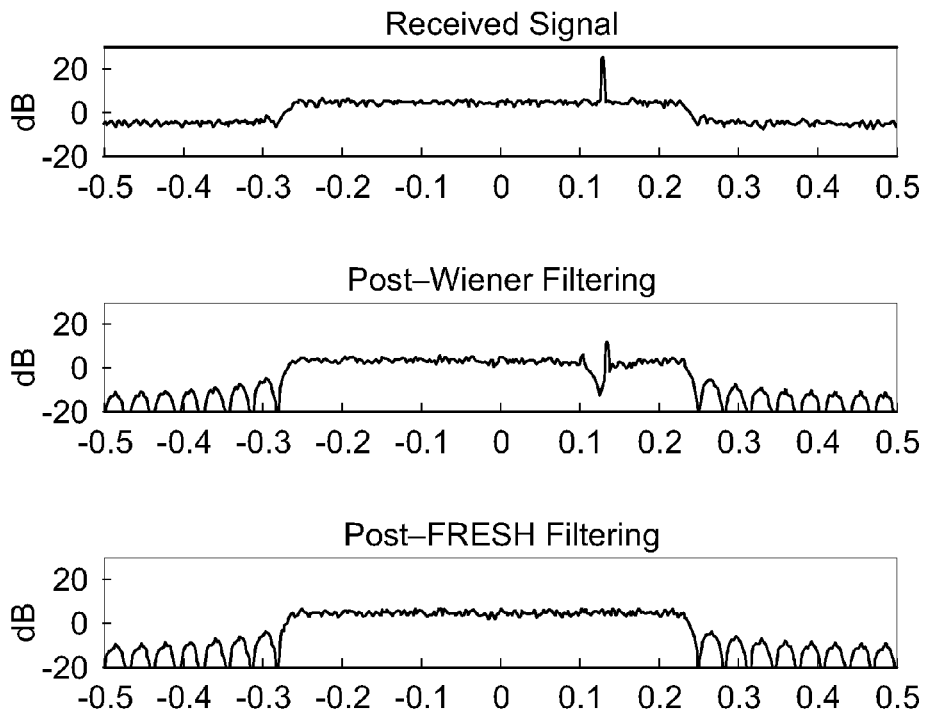
FIG. 9 illustrates, for another embodiment of the present invention, an example comparing Wiener filtering against a FRESH filter with a tone-based interferer and white Gaussian noise. This example is visually compares the performance between the Wiener filter and the FRESH filter. There are 16 subcarriers being used with each symbol being repeated twice in frequency and across two OFDM symbols. Visually it can be seen that the FRESH filter produces a better estimate of the SOI as compared to the Wiener filter, which has a difficult time removing the interference. In this example, the input SINR is 2.2 dB, the output SINR of the Wiener filter is 7.7 dB and the output SINR of the FRESH filter is 15.4 dB
Figure 10:
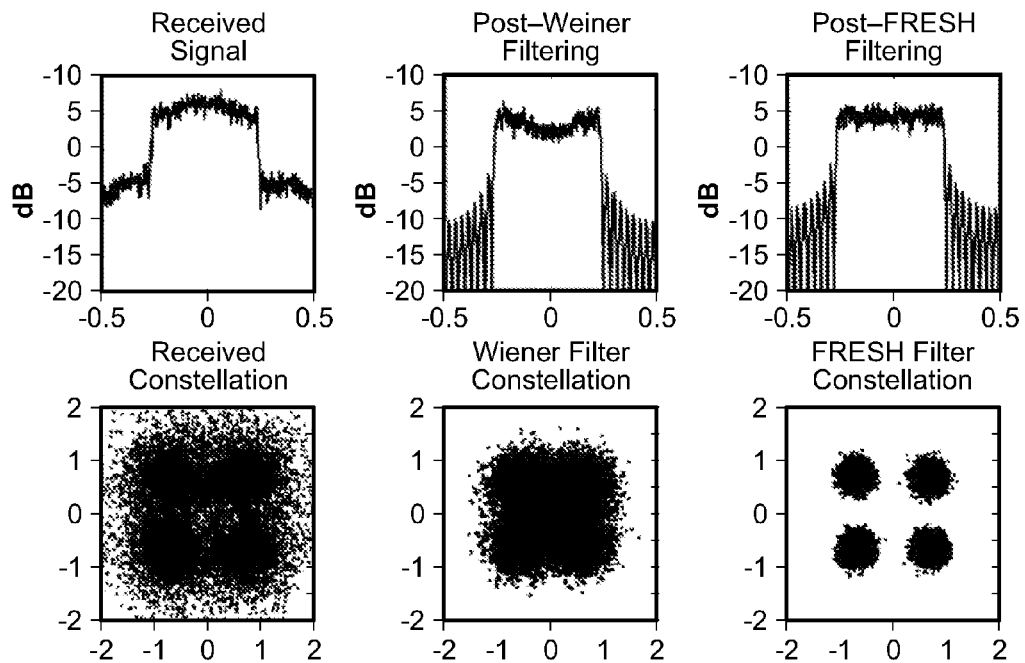
FIG. 10 illustrates, for another embodiment of the present invention, an example showing the performance in the presence of wideband interference. The OFDM signal is interfered with by a square root raised cosine (SRRC) QPSK signal of the same bandwidth, in addition to white Gaussian noise. There are 16 subcarriers of the OFDM signal which are repeated twice in time and twice in frequency. The input SINR is 4.5 dB, the output SINR of the Wiener filter is 6.2 dB and the output SINR of the FRESH filter is 14.3 dB, which is a considerable improvement.
Figure 11:
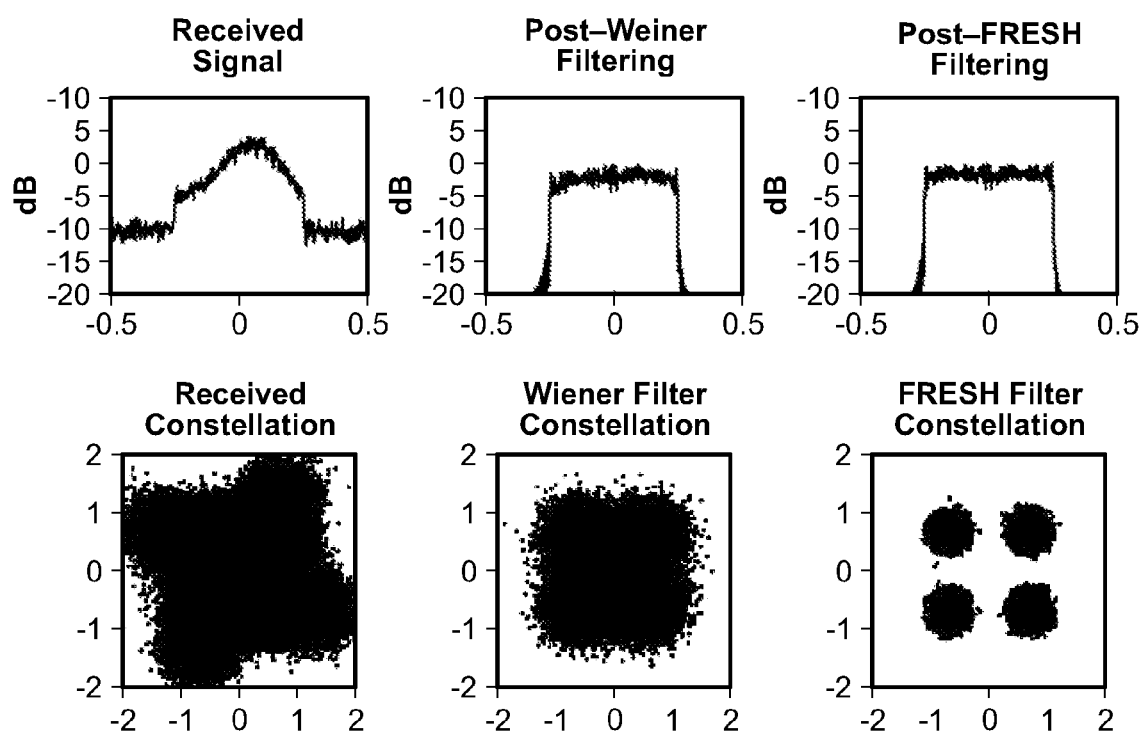
FIG. 11 illustrates, for another embodiment of the present invention, an example for an embodiment of the present invention showing performance of FRESH filtering in the presence of multipath and white Gaussian noise. In this example the 64 subcarriers are repeated twice within each OFDM symbol and across a block of two OFDM symbols. The input SINR is −4.2 dB considering the effect of the multipath, which shows a distorted spectral shape. The Wiener filter produces an output SINR of 8.8 dB, while the FRESH filter produces an output SINR of 15.0 dB. From the spectrum it can be seen that the Wiener filter is able to restore the spectral shape, but it cannot do so perfectly because of the noise. The FRESH filter makes use of the spectral correlation to cancel the effects of the multipath and some of the noise, as can be seen visually in the constellation diagrams. The channel is modeled as an FIR filter with taps [j, 0, −0.25+0.433j, 0, −0.1].

FIGS. 7-11 provide examples of improved performance over existing techniques in a variety of scenarios. The results show that interference and multipath is mitigated effectively using the embodiments of the present invention using subcarrier repetition and FRESH filtering. The FRESH filtering removes interference and channel effects down to the noise, as can be seen in FIGS. 10 and 11.

Figure 7:
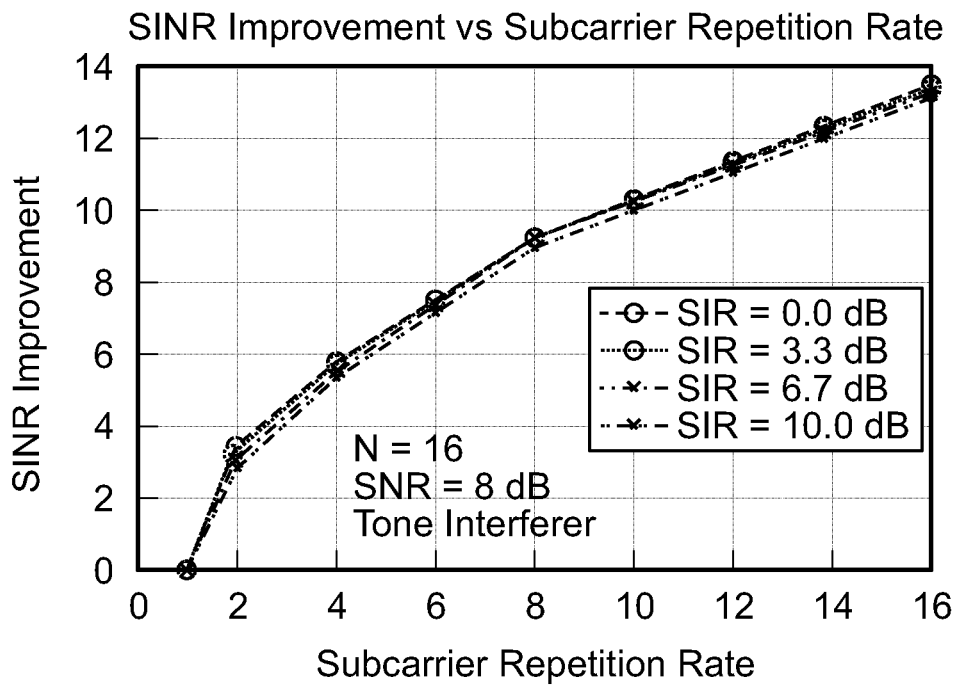
FIG. 7 provides results showing the improvement in SINR over the Wiener filter, for another embodiment of the present invention, when estimating the signal of interest. In this example the OFDM signal has N=16 subcarriers and the SNR is 8 dB. The SIR varies from 0 dB to 10 dB, and it is a tone interferer randomly placed throughout the passband of the OFDM signal. There is no multipath in this example. The Wiener Filter is represented here by a repetition rate of 1. Improvements increase dramatically as the repetition rate increases, but at the cost of a loss of data throughput.

FIG. 7 shows performance improvement in the presence of an interferer when the subcarrier repetition is only within each OFDM symbol. FIG. 8 shows a BER plot for a few modulations when only in the presence of noise. FIG. 9 gives the performance in the presence of a narrowband interferer for repetition in both time and frequency. FIG. 10 gives the performance in the presence of a wideband interferer for repetition in both time and frequency. FIG. 11 gives the performance when the repetition is across time and frequency, but when there is a multipath channel.

Figure 12:
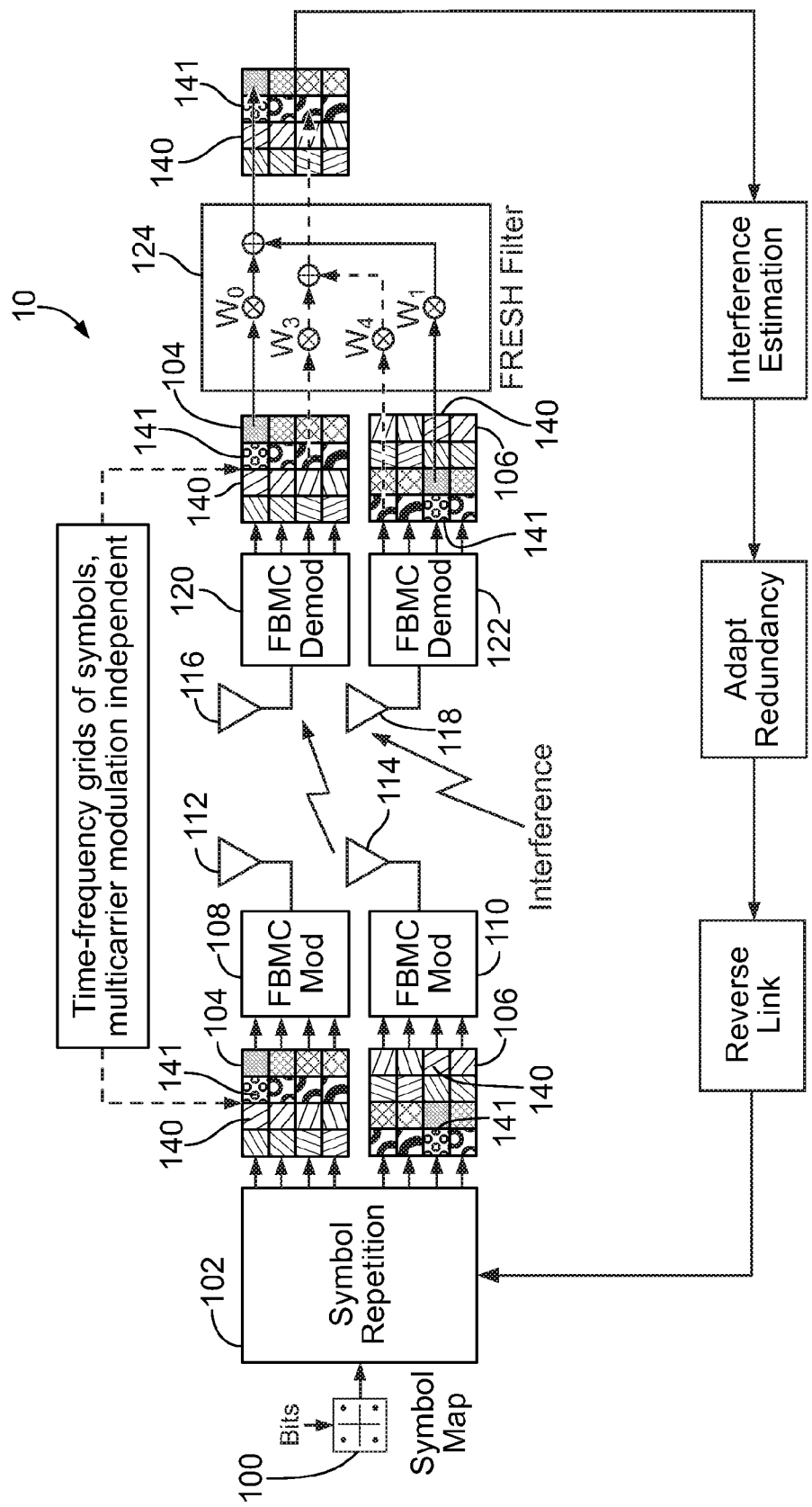
FIG. 12 provides a system level diagram for an embodiment of the present invention. Redundancy is added into the transmitted signal through subcarrier repetition, marked by the shading. The receiver optimally soft combines the redundant symbols using a FRESH filter. Performance of the link and estimates of the interference are used to adapt the redundancy to track any time-varying nature to the interference.

A system level diagram for another embodiment of the present invention is given in FIG. 12. In this figure, redundancy is applied to the signal in time, frequency and spatial dimensions through symbol repetition across subcarriers. Redundant symbols are marked by using the same color/shading in the figure. The redundancy is formed across a time-frequency grid and can include spatial repetition as well.

The forward link is using FBMC, although it could be using any multicarrier modulation such as OFDM or SC-FDM. The redundant symbols are transmitted using FBMC which are then demodulated, filtered and soft combined at the receiver for an embodiment using a FRESH filter. The redundancy is adapted according to estimates of the interference, and this information is carried on the reverse link. The adaptation of the redundancy is used to track any changes of the interference with time. The reverse link could also have a similar redundancy scheme applied to it as well, although the diagram includes a simplified view of the reverse link for clarity.

Although shown here with redundancy in all three dimensions (time, frequency and space), this is not required and the approach can operate with a single antenna as well.

In yet other embodiments, the present invention provides a technique for communicating in interference-limited environments that works with multicarrier signaling formats. The embodiment challenges the assumption of multicarrier waveforms that each of the subcarriers are statistically independent and instead designs redundancy into the signal by repeating symbols in time, frequency and space.

This approach is effective because diversity is designed into the waveform to best reduce the impact of the interference. The redundant symbols of the waveform are then soft-combined at the receiver using a FRESH filter (FIG. 13) which incorporates spectral redundancy in both time and frequency. The proposed Minimum Mean Square Error (MMSE) filter structure orthogonalizes the waveform and the interference as best as possible using the cyclostationary properties of the FBMC signal and any interfering signals. The proposed filter structure is periodically time-varying (PTV) as it incorporates spectral redundancy within both the waveform and interference by frequency shifting, filtering and summing the result to perform the interference cancellation. The time-varying nature of the filter results in it outperforming the Wiener filter and other linear time-invariant (LTI) filters when applied to a cyclostationary signal. This is true even when the desired signal is corrupted by interference, multipath, or a combination of the two. Examples of the proposed filter dramatically outperforming the Wiener filter, which is the MMSE notch filter, is given in FIGS. 16A-D and 17A-D.

Applying the filtering process after demodulation has the benefit of reducing the amount of computation needed for the filtering. Only redundant subcarriers need to be filtered and summed, and each symbol is filtered by a single weight. As seen in FIG. 12, each symbol is repeated twice. The estimate of the received symbols therefore is a linear combination of filter weights, $W_0$, $W_1$, $W_3$, $W_4$. This may scale, and with N repeated symbols there would be N filter weights to perform the combining.

The redundancy in FIG. 12 is depicted as covering the whole frequency band, although this does not need to be the case. The amount of repetition and the pattern that is used are adaptable to the interference. Wideband interference will have repetition that covers a large portion of the frequency band, while narrowband interference will have much less redundancy, and it will be localized to the affected frequency band.

In other embodiments, the present invention, as shown in FIG. 12, provides a system for processing a multi-carrier signal to create a spectral correlation across multiple antennas. System 10 has a transmitter that receives bits which are formed into symbols, with each symbol representing one or more bits from a plurality of bits. Symbol repetition 102 is performed by a transmitter that creates a plurality of repetition patterns 104 and 106, each pattern containing a copy of the symbols some of which, but not all, are designated as 140 and 141. In addition, each repetition pattern comprises a combination of symbols that varies in time, frequency and space. Next, repetition patterns 104 and 106 are modulated by FBMC modulators 108 and 110 and transmitted over one or more separate antennas 112 and 114. Antennas 116 and 118 receive repetition patterns which are demodulated by FBMC demodulators 120 and 122 of a receiver. The received repetition patterns are linearly combined across time, frequency and space to estimate the transmitted symbol, which maybe done by a FRESH filter 124. Also, the waveform and demodulator are adapted based on the interference environment.

In other embodiments, the repetition patterns are formed from a plurality of bit streams. The bit streams may be comprised of data and the signal may be a communication signal. The repetition patterns may also be used for communications, the bits may also be formed into groups of symbols and the symbols are repeated in a plurality of repetition patterns or the repetition patterns may be used for channel equalization.

In addition, the multi-carrier signal has cyclostationary properties that permit a plurality of signals to be used in the same spectrum. Also, the cyclostationary properties also permit a plurality of the same multi-carrier signals to be used in the same spectrum with the signals designed to be separated at predetermined receivers.

The filtering structure can also be pulled into the demodulation and synchronization algorithms which would make signal acquisition possible in low SINR scenarios.

The above described embodiment of the present invention provides several advantages. First, the waveform can be designed on the fly while adapting to changes in the interference. The waveform can also scale in real time with the interference as it becomes more or less impactful on the quality of the communication link. As the interference becomes more severe, the amount of redundancy can be increased to maintain the link. Furthermore, as the proposed waveform is multicarrier, the inherent benefits of multipath resistance are retained, and because the FRESH filter incorporates spectral redundancy it performs better than traditional time-invariant and fractionally-spaced equalizers.

The embodiment performs significantly better than ECCs at very low SINR values. Traditional ECCs make the assumption that the receive signal is corrupted by stationary white noise, yet in strong interference, these assumptions and the performance of these codes break down. Most communication signals are cyclostationary for which the FRESH filter is the optimal receiver. By applying the optimal filter, the present invention outperforms the ECCs in scenarios which they are often used incorrectly.

Figure 13:
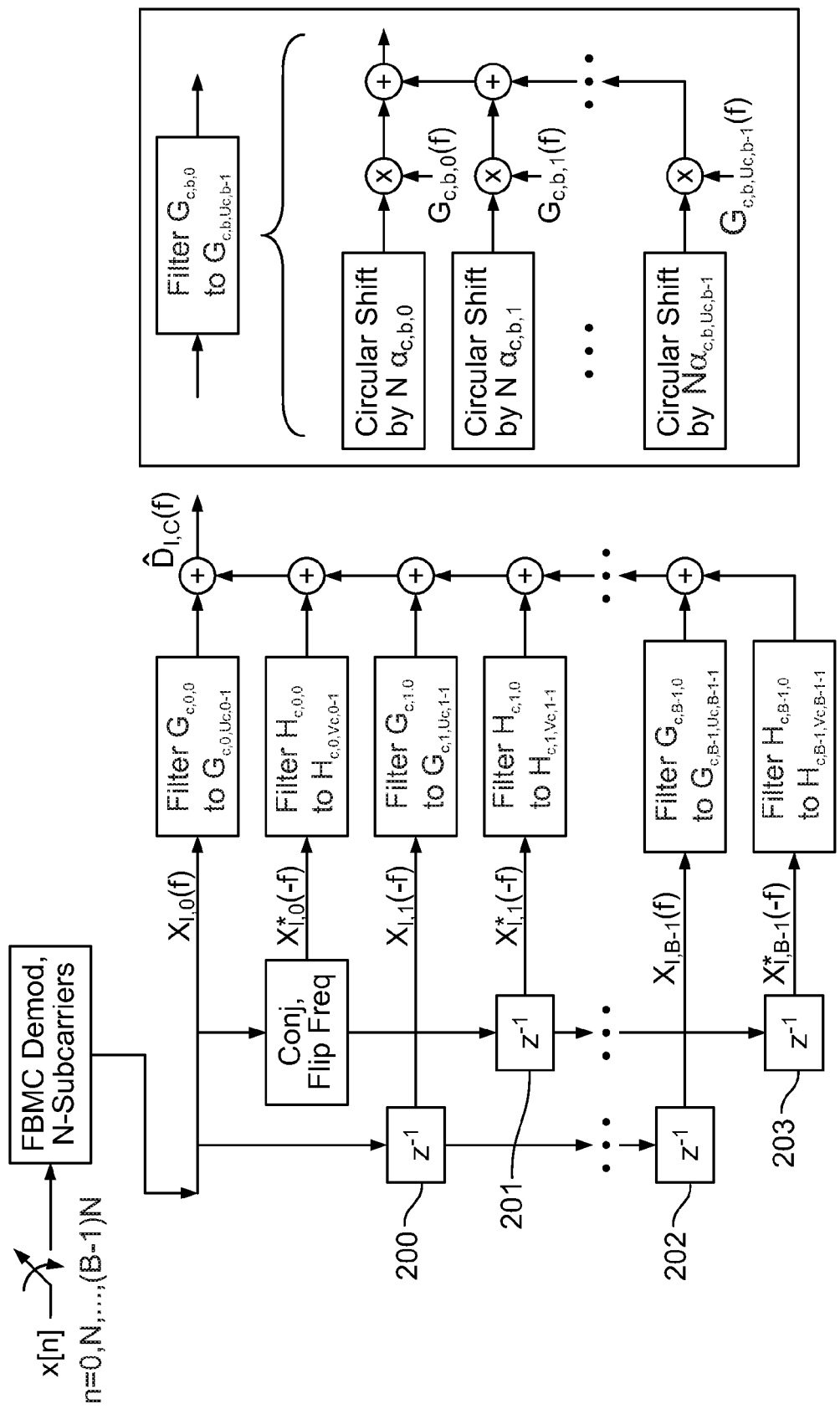
FIG. 13 depicts a digital implementation of the filtering structure for an embodiment of the present invention which incorporates the diversity in both time and frequency. The transmitted signal can have redundancy across multiple FBMC symbols, in this case it is B symbols. These symbols are demodulated, gathered and then jointly FRESH filtered to remove the interference.
Figure 16A:
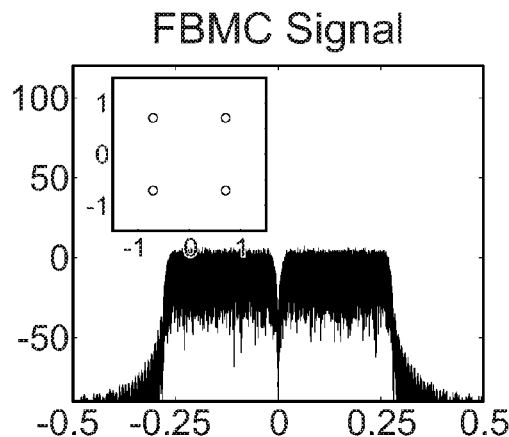
FIG. 16A, FIG. 16B, FIG. 16C and FIG. 16D provide results, for another embodiment of the present invention, that are for FBMC, and demonstrate narrowband interference being effectively removed with the proposed method, even with SINR=−20 dB. The improvement over a notch filter is 7.6 dB.
Figure 16B:
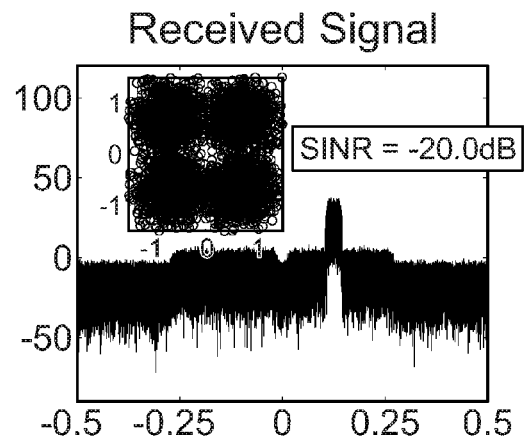
Figure 16C:
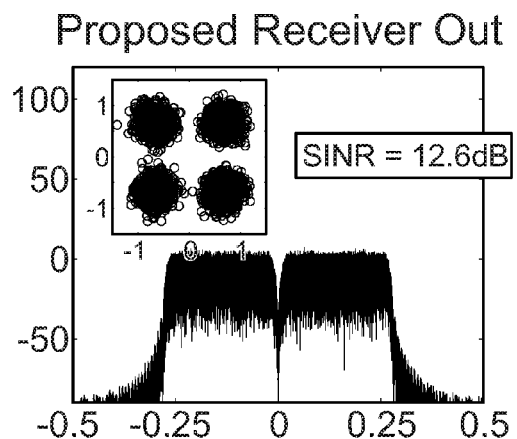
Figure 16D:
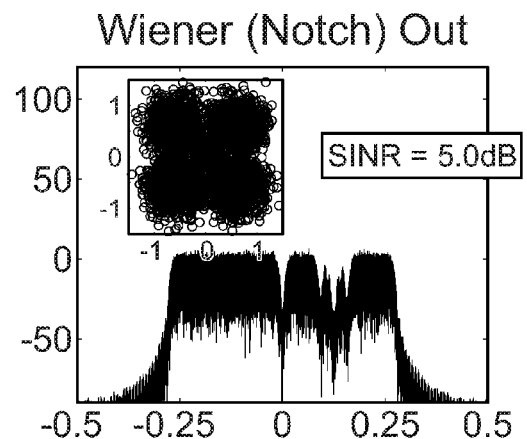
Figure 17A:
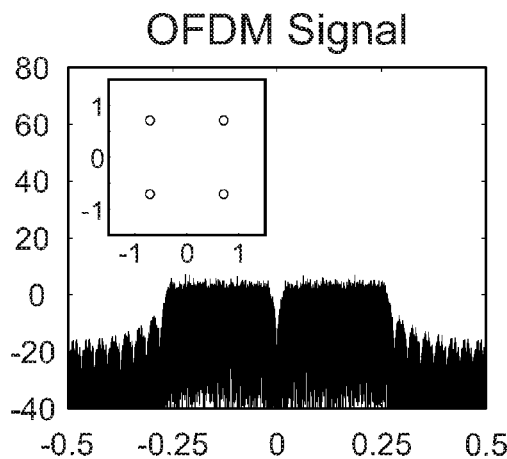
FIG. 17A, FIG. 17B, FIG. 17C and FIG. 17D provide results, for another embodiment of the present invention for OFDM. The results are even better for this due to the higher sidelobes of OFDM, with an improvement of 10.8 dB in SINR.
Figure 17B:
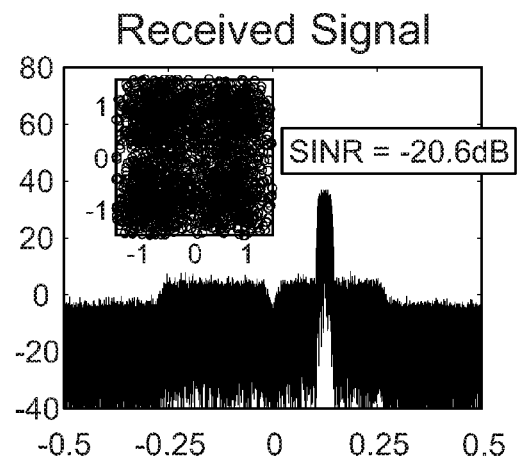
Figure 17C:
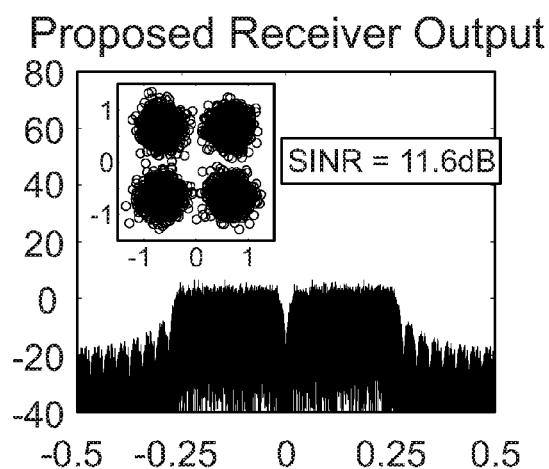
Figure 17D:
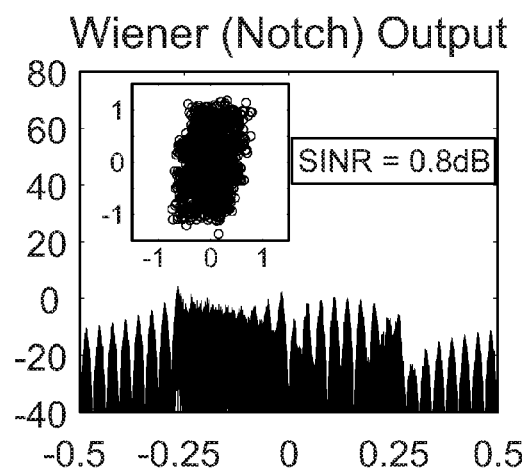

FIG. 13 demonstrates another filtering structure that may be used to filter and soft combine the redundant symbols in both time and frequency. Although proposed and demonstrated with FBMC, the methods of this embodiment of the present invention are applicable to other multicarrier waveforms as well. FIG. 13 shows a block diagram showing how time-varying spectral redundancy is filtered. A series of delay lines 200-203 are used to store the signal in memory, allowing the block of symbols to be jointly filtered in time and frequency. The inset image shows the detail for each series of subfilters, describing that they are linear combinations of circularly shifted frequency domain samples and the complex filter weights.

The coordination between the receiver and the transmitter of the repetition pattern may be done by designing into the system the ability to learn the repetition structure through using a training sequence. As the receiver is an optimal filter, it can be trained to perform the demodulation of the waveform, no matter the location of the redundant subcarriers. Once a link is established additional information about the framing structure can be sent. There are other structures that are possible as well, including using all of the subcarriers containing redundant information to provide the basic framing structure information. The filter may also be configured to learn a previously unknown repetition pattern by adapting to the cyclostationary properties of the signal.

Due to the complexity of present day wireless networks, there is a need for techniques other than the traditional notions of good waveform design such as maximizing spectral efficiency, minimizing excess bandwidth and increasing stop band rejection. While these are all valid metrics, maximizing throughput is important but relating that directly to a waveform design is very difficult. The present invention bridges the gap by incorporating interference rejection into the waveform and receiver design, as well as adapting the approach over time to include any temporal changes in the interference. To demonstrate the effectiveness of the embodiments of the present invention bit error rates are provided in FIGS. 14A-C and 15A-C. FIGS. 16A-D and 17A-D also demonstrate the performance of the embodiments of the present invention without being tied to a specific modulation scheme. Results for both FBMC and OFDM are given, and all results are using a single antenna.

FIGS. 14-15 show results comparing the bit error rate for a waveform with ¼ rate convolutional code, and with the proposed waveform with each symbol being repeated 4 times which is an equivalent amount of signaling overhead. Results are given for both FBMC and OFDM waveforms. Results show that the present invention performs better than a convolutional code for the same amount of signaling overhead.

The interference is a single carrier QAM signal with the same 3 dB bandwidth as the FBMC and OFDM waveforms, with SIR=0 dB. The FBMC and OFDM waveforms use QPSK on all of their subcarriers. It can be seen from the BER curves at Eb/N0=10 dB the symbol repetition of the present invention has a BER an order of magnitude better than that of convolutional coding, $10^{-2}$ compared to $10^{-1}$, and this is true for both waveforms.

In other aspects of the present invention, a hybrid approach is provided. This embodiment could also be used to improve the BER further if needed. Symbol repetition is used for interference rejection and conditioning of the signal to bring it to an operating point where the error correcting codes can be used for noise rejection.

FIGS. 16A-D and 17A-D depict another embodiment of the present invention where the signal is corrupted by a dominant narrowband interferer whose power is significantly larger than that of the underlying signal of interest, with SIR=−20 dB. There is also AWGN present in the received signal with SNR=10 dB. These results also repeat each symbol four times as in the previous results.

The results show that the receiver of the present invention removes the interference down to the noise floor as the SINR>10 dB, and it is actually a few dB better for both FBMC and OFDM. This also does not include any error correcting codes, the inclusion of which would further improve the SINR.

Where FBMC is used, the output SINR is 12.6 dB, which is 7.6 dB better than a traditional notch filter. This is a dramatic improvement, but not as large as in OFDM.

The output SINR for the OFDM signal with the receiver of the present invention is 11.6 dB, while the output of the Wiener filter is 0.8 dB. With such a large interferer, the Wiener filter is so overwhelmed by the interference that the best it can do is try and squash the constellation points into a single cloud of the same average energy as the desired signal. Since the sidelobes are so poor for the OFDM signal, many subcarriers are effected by the interference and the application of the Wiener filter, resulting in such a low SINR.

Even stronger interference could be removed using the embodiments of the present invention. The limitation in a digital implementation would be the saturation of the ADC, and in these cases an analog implementation would retain the dynamic range.

An important outcome of this result is the ability for a filter to do the interference rejection, rather than an error correcting code. The FRESH filter can be implemented as a series of multiply-accumulates for efficient implementation. Additionally, because the interference rejection is done within the filter, the present invention is able to incorporate this into the synchronization routines much easier, making signal acquisition possible in situations that would otherwise be nearly impossible, as in FIG. 16A-D.

In other embodiments, the present invention provides a unified structure for time, frequency and space resource management. The distribution of redundancy across these dimensions allows the waveform to have multiple applications. The following are potential applications for the proposed technique: Heterogeneous Waveform Co-existence; Control Channel Protection; Robust and Reliable Waveforms; Multi-user Access and Dynamic Spectrum Access (DSA) Waveforms.

With increasingly dense networks, there is also a need for the ability to easily cancel signals so they do not cause undue interference themselves. The FBMC signal can be designed such that other signals could more easily cancel it, leading to more throughput for the network.

Another application for the embodiments of the present invention is the protection of control channels. One example is to always use a repetition pattern on a control channel to make it robust against interference. Control channels are extremely important to the operation of a network, and while redundancy would reduce the capacity, it would make them much more resilient and reliable, and thereby making the network more reliable as well. Conversely, redundancy across the data channels can have a big impact on the capacity of the network, therefore it can be added only as needed. Additionally, the amount of redundancy can scale with the severity of the interference, allowing the network to scale its capacity gradually, rather than just failing in the presence of too much interference.

Another application for the embodiments of the present invention is that it may be used to design waveforms for shared channel access in a multi-user access or DSA scenario. Jointly designing the repetition patterns for multiple signals allows them to be separated at their receivers.

Figure 18:
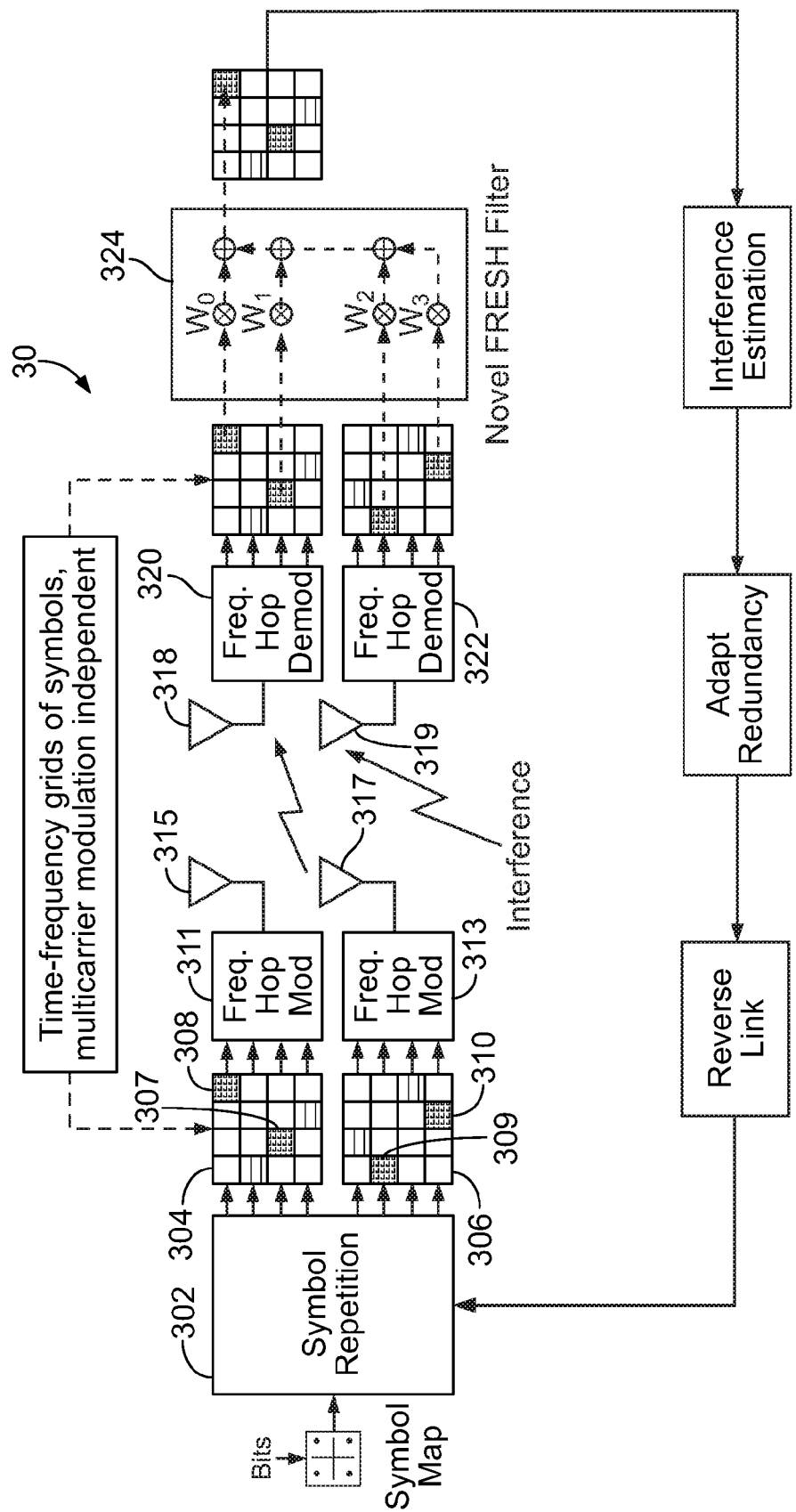
FIG. 18 provides a system level diagram for another embodiment of the present invention when applied to frequency hopping systems. Redundancy is added into the transmitted signal through symbol repetition, marked by shading. The receiver optimally soft combines the redundant symbols across two antennas using a FRESH filter. Performance of the link and estimates of the interference are used to adapt the redundancy to track any time-varying nature to the interference. The technique is applicable to single antenna systems as well.

A system level diagram for another embodiment of the present invention that may be used with heavy interference is given in FIG. 18. As shown, redundancy is applied to the signal in time, frequency and spatial dimensions through symbol repetition. Redundant symbols are marked by shading. The redundancy is formed across a time-frequency grid and can include spatial repetition as well. The redundant symbols are demodulated, filtered and soft combined at the receiver with a FRESH filter structure, which is given in FIG. 13. The redundancy is adapted according to estimates of the interference, and this information is carried on the reverse link. The adaptation of the redundancy is used to track any changes of the interference with time. The reverse link could also have a similar redundancy scheme applied to it as well, although the diagram includes a simplified view of the reverse link for clarity. The redundant symbols of the waveform are optimally soft-combined at the receiver using a newly developed FRESH filter (FIG. 13) which incorporates spectral redundancy in both time and frequency. The proposed Minimum Mean Square Error (MMSE) filter structure orthogonalizes the waveform and the interference as best as possible using the cyclostationary properties of the proposed frequency hopping signal and any interfering signals. The proposed filter structure is periodically time-varying (PTV) as it incorporates spectral redundancy within both the waveform and interference by frequency shifting, filtering and summing the result to perform the interference cancellation. The time-varying nature of the proposed filter results in it outperforming the Wiener filter and other linear time-invariant (LTI) filters such as notch filters when applied to a cyclostationary signal. This is true when the desired signal is corrupted by interference, multipath or a combination of the two.

Applying the filtering process after demodulation has the benefit of reducing the amount of computation needed for the filtering. Only redundant subcarriers need to be filtered and summed, and each symbol is filtered by a single weight. As seen in FIG. 18, a system 30 for processing a frequency hopping signal to create a spectral correlation across multiple antennas is provided. System 30 receives bits which are formed into symbols, with each symbol representing one or more bits from a plurality of bits. Symbol repetition 302 is performed by creating a plurality of repetition patterns 304 and 306, each pattern containing a copy of the symbols. In addition, each repetition pattern comprises a combination of symbols that varies in time, frequency and space. Next, repetition patterns 304 and 306 are modulated by frequency hopping modulators 311 and 313 and transmitted over one or more separate antennas 315 and 317. Antennas 318 and 319 receive repetition patterns which are modulated by frequency hop demodulators 320 and 322. The received repetition patterns are linearly combined across time, frequency and space to estimate the transmitted symbol, which maybe done by a FRESH filter 324. In addition, each symbol, one example of which is symbols 307-310 is repeated four times. The estimate of the received symbols therefore is a linear combination of filter weights, $W_0$, $W_1$, $W_2$, $W_3$. This would scale, and with N repeated symbols, there would be N filter weights to perform the combining. This is quite remarkable given the amount of interference rejection for this little amount of computation. The benefit of using filter 324 for interference rejection means that it can also be pulled into the demodulation and synchronization algorithms which would make signal acquisition possible in low SINR scenarios, a technique that is very difficult to do with error correcting codes due to their latency in decoding.

The approach can be implemented as an add-on to existing systems. The application of the filtering process is post-demodulation, and the transmission of redundant symbols is a very minor change to the control logic of frequency hop transmitters 311 and 313. As the introduction of the redundancy happens prior to the modulator and the extraction of the redundancy happens after the demodulation (FIG. 18), a vast majority of the physical layer processing within existing systems would not need to be changed.

The waveform and receiver can be optimized and trained on the fly to maximize the capacity while under interference. Using an optimization approach, such as Simulated Annealing, would allow a large space to be searched quickly, and it can be bolstered with AI approaches like Case Based Reasoning to jump start and initialize the optimization routine. The optimization would greatly increase the capacity over traditional methods of waveform adaptation and would take into account power constraints, varying the modulation order per subcarrier, symbol repetition patterns and error correcting codes. By weighting objectives appropriately, a solution can be found which minimizes the transmit power and maximizes throughput. Another alternative is to use spectrum sensing to estimate the spectral environment, and then perform the optimization off-line.

Figure 19:
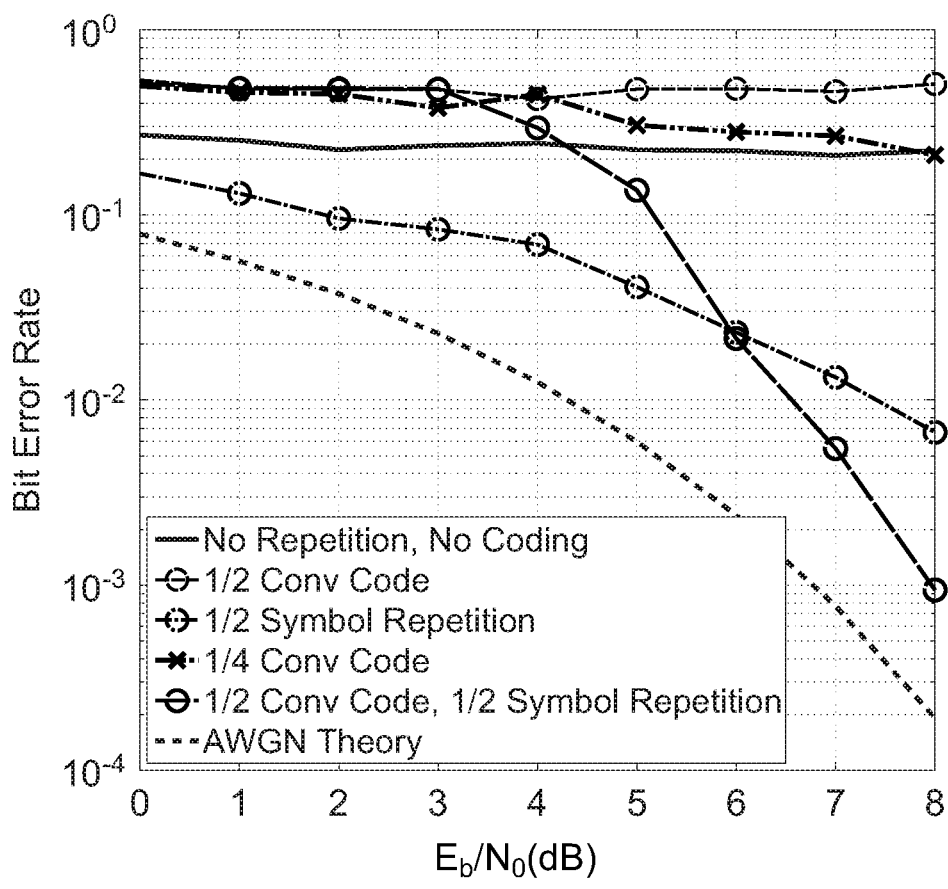
FIG. 19 shows that the present invention dramatically outperforms convolutional codes in the presence of repeat jamming when using a frequency hopping system. Even a small amount of symbol repetition such as ½ rate provides considerable improvement in the bit error rate. A hybrid approach with both symbol repetition and convolutional encoding can be used to further improve the BER.

The impact of a repeat jammer, or Digital Radio Frequency Memory (DRFM) jammer is modeled for the results in FIG. 19. All results are for single antenna simulations. In this example, the repeat jammer retransmits the desired signal with a half symbol period delay at the same power. The results show that the embodiments of the present invention operate very well in this environment while the convolutional codes are completely overwhelmed and the communication link is essentially unusable due to the poor BER.

All of the BER curves employ some type of filtering: when symbol repetition is used, filtering may be done by a FRESH filter. When symbol repetition is not used, a Wiener filter may be used. The Wiener filter is the MMSE time invariant filter, which tends to act as a notch filter, and in this case operates very poorly. The "No Repetition, No Coding" result arises from only the application of the Wiener filter.

The repeat jamming scenario can be thought of as a multi-path channel which plays directly into the strengths of the FRESH filter. The FRESH filter is an improved version of a fractionally spaced equalizer, with the improvement coming from its ability to incorporate spectral redundancy into its estimates of the desired signal. It is for these same reasons that the convolutional codes operate so poorly. The large amount of cyclostationary interference breaks down the assumptions of stationary noise that the convolutional codes require. The codes are also unable to deal with the large amounts of correlation between the desired signal and interference in the time and frequency domain, which the FRESH filter is able to do. The operation is analogous to a rake receiver, with its ability to collect all of the transmitted energy from the two sources into improving the estimate of the desired signal.

The "AWGN Theory" curve represents the theoretical bit error rate curve for QPSK in white noise without DRFM. As the DRFM retransmits the desired signal, it increases the total energy per bit and the remaining curves are scaled by this increase in energy.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A method of processing a multi-carrier signal to create a spectral correlation across multiple antennas, comprising:
configuring one or more multi-carrier signals to have cyclostationary properties that permit a plurality of the same mufti-carrier signals to be used in the same spectrum and said signals are designed to be separated at predetermined receivers;
receiving a plurality of bits;
creating a plurality of symbols, each symbol representing one or more bits from said plurality of bits;
providing one or more filters having a series of delay lines, said delay lines used to store said signals in memory, allowing repeated symbols to be jointly filtered in time and frequency, said one or more filters learn a previously unknown repetition pattern by adapting to the cyclostationary properties of the signal;
creating a plurality of repetition patterns, each pattern containing a copy of said symbols and used for channel equalization;
each repetition pattern comprising a combination of said symbols that varies in time, frequency and space;
said repetition patterns transmitted over one or more separate antennas;
receiving said repetition patterns over one or more separate antennas;
demodulating said received repetition patterns; and
linearly combining each repeated symbols across time, frequency and space to estimate said transmitted symbol.

2. The method of claim 1 wherein said repetition patterns are formed from a plurality of bit streams.

3. The method of claim 1 wherein said bit streams is comprised of data.

4. The method of claim 1 wherein said bit streams is a communication signal.

5. The method of claim 1 wherein said bit streams is comprised of data to form a communication signal.

6. The method of claim 1 wherein said repetition patterns are used for communications.

7. The method of claim 1 wherein said bits are formed into groups of symbols and said symbols are repeated in said plurality of repetition patterns.

8. The method of claim 1 wherein said waveform and demodulator are adapted based on the interference environment.

* * * * *